United States Patent
Song et al.

(10) Patent No.: US 9,500,247 B2
(45) Date of Patent: Nov. 22, 2016

(54) POUNDING TUNE MASS DAMPER WITH VISCOELASTIC MATERIAL

(75) Inventors: Gangbing Song, Pearland, TX (US); Luyu Li, Houston, TX (US); Mithun Singla, Houston, TX (US); Yi-Lung Mo, Pearland, TX (US)

(73) Assignee: University of Houston, Houston, TX (US)

( * ) Notice: Subject to any disclaimer, the term of this patent is extended or adjusted under 35 U.S.C. 154(b) by 1274 days.

(21) Appl. No.: 12/917,456

(22) Filed: Nov. 1, 2010

(65) Prior Publication Data

US 2012/0103739 A1   May 3, 2012

(51) Int. Cl.
*F16F 7/104* (2006.01)

(52) U.S. Cl.
CPC ..................... *F16F 7/104* (2013.01)

(58) Field of Classification Search
CPC .................. F16F 7/104; F16F 7/116
USPC ............ 188/378, 379; 181/207, 208
See application file for complete search history.

(56) References Cited

U.S. PATENT DOCUMENTS

| | | | | |
|---|---|---|---|---|
| 1,973,510 A * | 9/1934 | Schieferstein | ............... | 188/378 |
| 2,195,041 A * | 3/1940 | Von Schlippe | ............... | 188/378 |
| 2,715,951 A * | 8/1955 | Lieber | ............... | 188/378 |
| 3,757,761 A * | 9/1973 | Izuta | ............... | 124/23.1 |
| 3,932,056 A | 1/1976 | Tai | | |
| 4,761,925 A * | 8/1988 | Fukahori et al. | ......... | 267/141.1 |
| 4,852,848 A * | 8/1989 | Kucera | ............... | 188/379 |
| 4,950,528 A * | 8/1990 | Iizuka et al. | ............... | 267/152 |
| 4,962,826 A | 10/1990 | House | | |
| 5,020,978 A | 6/1991 | Nashif | | |
| 5,193,644 A * | 3/1993 | Hart et al. | ............... | 188/379 |
| 5,366,198 A * | 11/1994 | Dickinson | ............... | 267/136 |
| 5,595,448 A * | 1/1997 | Harada | ............... | 400/320 |
| 5,678,840 A * | 10/1997 | Simonian | ............... | 188/378 |
| 5,971,375 A * | 10/1999 | Simonian et al. | ............ | 267/136 |
| 6,125,977 A * | 10/2000 | Nekomoto et al. | ........... | 188/378 |

(Continued)

FOREIGN PATENT DOCUMENTS

| | | |
|---|---|---|
| CN | 2581562 Y | 10/2003 |
| DE | 2056164 A1 | 5/1972 |

(Continued)

OTHER PUBLICATIONS

U.S. Appl. No. 12/620,506, filed Nov. 17, 2009, Omar M. Kabir.

(Continued)

*Primary Examiner* — Thomas J Williams
(74) *Attorney, Agent, or Firm* — Fletcher Yoder P.C.

(57) ABSTRACT

A vibration dampener, including, a first beam comprising a first mounting end portion and a first peripheral end portion, wherein the first peripheral end portion comprises a tunable mass, and the first beam is configured to vibrate in tune with a vibrational frequency of a structure supporting the first beam at the first mounting end portion, a second beam comprising a second mounting end portion and a second peripheral end portion, wherein the second peripheral end portion comprises a ring disposed about the first beam, and a viscoelastic material disposed between the first beam and the ring, wherein the viscoelastic material is configured to dampen vibrational energy as the first beam vibrates toward the ring until the viscoelastic material becomes compressed between the first beam and the ring during the course of the impact.

20 Claims, 5 Drawing Sheets

(56) References Cited

U.S. PATENT DOCUMENTS

| | | | |
|---|---|---|---|
| 6,129,177 A | 10/2000 | Gwinn | |
| 6,309,985 B1 | 10/2001 | Virnelson et al. | |
| 6,397,988 B1 * | 6/2002 | Ptak | 188/380 |
| 2002/0030315 A1 * | 3/2002 | Kato et al. | 267/141 |
| 2004/0105764 A1 | 6/2004 | Kach | |
| 2006/0191267 A1 | 8/2006 | Song et al. | |
| 2007/0068468 A1 | 3/2007 | Irick et al. | |
| 2008/0034884 A1 | 2/2008 | Song et al. | |
| 2009/0022450 A1 | 1/2009 | Song et al. | |
| 2014/0262656 A1 * | 9/2014 | Song | E21B 17/01 188/378 |

FOREIGN PATENT DOCUMENTS

| | | |
|---|---|---|
| EP | 0412816 | 2/1991 |
| EP | 0756673 A1 | 2/1997 |
| EP | 1132644 A2 | 9/2001 |
| GB | 2080920 A * | 2/1982 ........... B25D 17/043 |
| JP | 57137666 A * | 8/1982 |
| JP | 59050243 A * | 3/1984 |
| JP | 2001317680 | 11/2001 |
| JP | 2009035864 A | 2/2009 |
| SU | 1262156 A2 | 10/1986 |
| SU | 1397642 A1 | 6/1988 |

OTHER PUBLICATIONS

PCT Search Report and Written Opinion of PCT/US2011/046652, mailed on Dec. 14, 2011.

U.S. Appl. No. 12/631,424, filed Dec. 4, 2009, Kocurek et al.

U.S. Appl. No. 12/765,655, filed Apr. 22, 2010, Dr. Gangbing Song.

Russian Office Action dated Jul. 17, 2015 for RU Application No. 2013122045, 10 pages.

First Office Action in Chinese Patent Application No. 201180063732.X mailed Sep. 3, 2014.

* cited by examiner

POUNDING TUNE MASS DAMPER WITH VISCOELASTIC MATERIAL

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many types of pipe, such as pipes used in sub-sea jumper systems, may be subjected to the flow of fluids across their surfaces (both internal and external). The flow of fluids may lead to vibration of the pipe, such as vortex-induced vibration. Over time, the vibration can lead to damage and/or failure of the pipe.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain exemplary embodiments of the present invention include systems and methods for dampening the vibration of sections of pipe, such as pipes used in sub-sea jumper systems. In particular, the disclosed embodiments include the use of viscoelastic material in combination with a tuned mass damper. More specifically, in certain embodiments, the tuned mass tamper may include a first beam having a tunable mass, wherein the first beam is coupled to and vibrates with the pipe. The tuned mass damper may also include a secure beam having a limiting device (e.g., a ring portion) disposed about a segment of the first beam. Furthermore, a viscoelastic material may be disposed on the segment of the first beam and/or the limiting device of the second beam. As the pipe vibrates, the first beam with the tunable mass vibrates within the limiting device. As the first and second beams contact one another in the form of impact, the viscoelastic material absorbs the vibrational energy, thereby dampening the vibration in the pipe.

Figure 1:
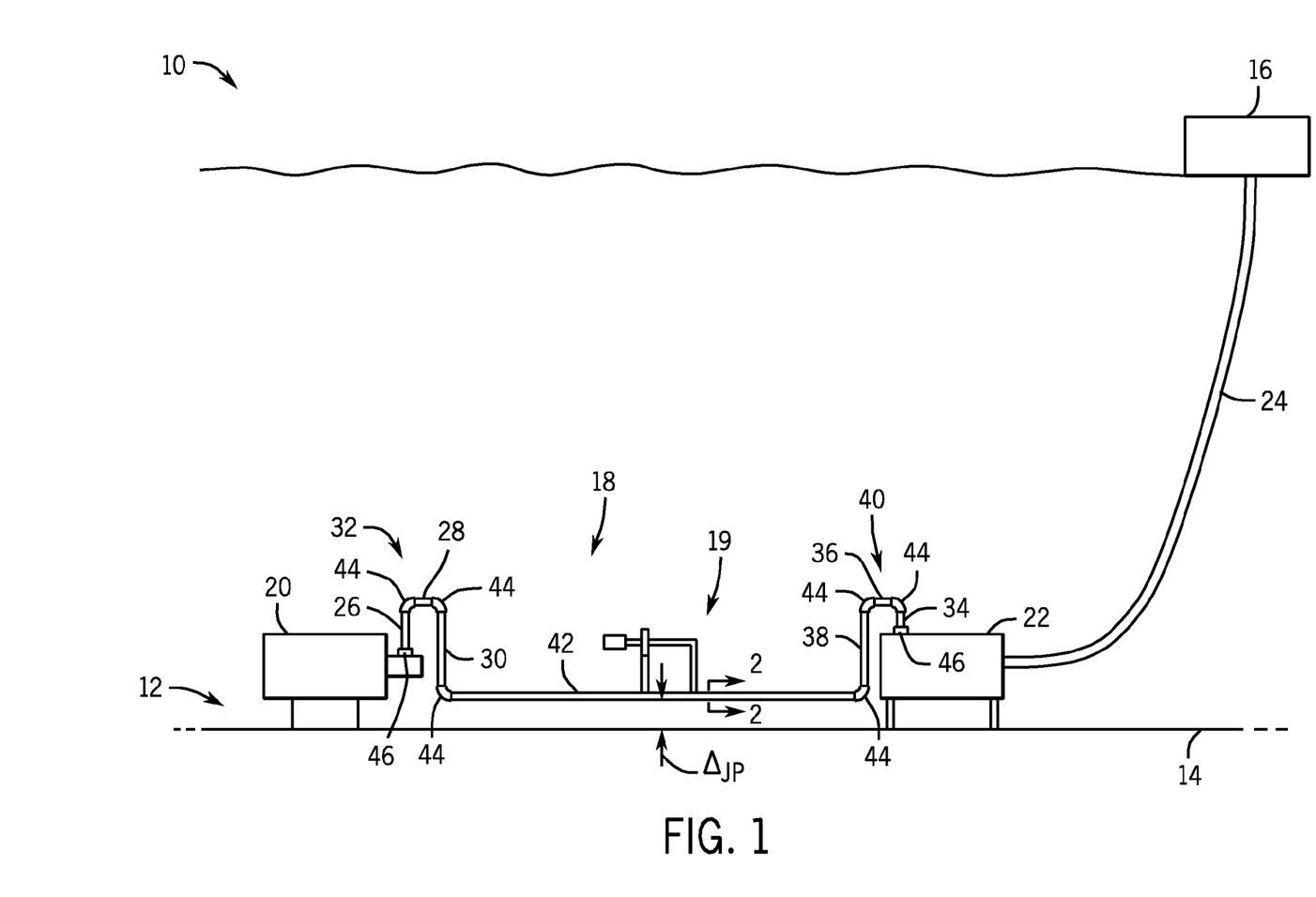
FIG. 1 is a schematic diagram of an embodiment of a sub-sea resource extraction system having a jumper system that utilizes a viscoelastic tuned mass damper system.

FIG. 1 is a schematic diagram of an embodiment of a sub-sea resource extraction system 10. The sub-sea resource extraction system 10 may be used to extract oil, natural gas, and other natural resources from a well 12, located on a sub-sea floor 14, to an extraction point at a surface location 16 (e.g., an on-shore processing facility, an off-shore rig, or any other extraction point). The sub-sea resource extraction system 10 may also be used to inject fluids, such as chemicals, steam, and so forth, into the well 12. These injected fluids may aid the extraction of resources from the well 12. The sub-sea resource extraction system 10 may, in certain embodiments, include a jumper system 18 with a vibration damper system 19. The jumper system 18 is connected to a Christmas tree 20 of the well 12 and a manifold 22. The oil, natural gas, or other resources may, in certain embodiments, be collected at the well 12, and travel through the Christmas tree 20 to the manifold 22 through the jumper system 18. From the manifold 22, the oil, natural gas, or other resources may be transported to the surface location 16 via export flow lines 24.

As illustrated, the jumper system 18 may include a series of pipes specifically configured to connect the Christmas tree 20 to the manifold 22. For example, the jumper system 18 may include a first vertical pipe 26 extending generally upwardly from the Christmas tree 20, a first horizontal pipe 28 extending generally horizontally from the first vertical pipe 26 toward the manifold 22, and a second vertical pipe 30 extending generally downwardly from the first horizontal pipe 28 toward the sub-sea floor 14. As such, these three pipes 26, 28, generally form a first u-shaped pipe formation 32. In addition, the jumper system 18 may include a third vertical pipe 34 extending generally upwardly from the manifold 22, a second horizontal pipe 36 extending generally horizontally from the third vertical pipe 34 toward the Christmas tree 20, and a fourth vertical pipe 38 extending generally downwardly from the second horizontal pipe 36 toward the sub-sea floor 14. As such, these three pipes 34, 36, 38 generally form a second u-shaped pipe formation 40. In addition, the jumper system 18 may include a main jumper pipe 42 extending generally horizontally from the bottom of the second vertical pipe 30 near the Christmas tree 20 to the bottom of the fourth vertical pipe 38 near the manifold 22.

The jumper system 18 may also include several connectors for connecting the pipes 26, 28, 30, 34, 36, 38, and 42 to the Christmas tree 20, manifold 22, and each other. For example, the jumper system 18 may include several 90-degree elbows 44 between adjacent pipes 26, 28, 30, 34, 36, 38, and 42. In addition, the jumper system 18 may include pressure connectors 46 at either end of the jumper system 18 for connecting to the Christmas tree 20 and the manifold 22. For example, a pressure connector 46 may connect the first vertical pipe 26 to the Christmas tree 20 and another pressure connector 46 may connect the third vertical pipe 34 to the manifold 22.

The specific sizes, configurations, and characteristics of the pipes 26, 28, 30, 34, 36, 38, and 42 of the jumper system 18 may vary between specific implementations. However, common outside diameters for the pipes 26, 28, 30, 34, 36, 38, and 42 may fall within a range of approximately 4.5 inches to 10.75 inches (e.g., nominal pipe sizes of approximately 4 inches to 10 inches). For example, in certain embodiments, the outside diameters of the pipes 26, 28, 30, 34, 36, 38, and 42 may be 4.5 inches, 6.625 inches, 8.625 inches, 10.75 inches, and so forth. However, in other embodiments, the outside diameters of the pipes 26, 28, 30, 34, 36, 38, and 42 may fall within a range of approximately 2.375 inches to 24 inches (e.g., nominal pipe sizes of approximately 2 inches to 24 inches), or even greater. For example, in certain embodiments, the outside diameters of the pipes 26, 28, 30, 34, 36, 38, and 42 may be 2.375 inches, 3.5 inches, 4.5 inches, 6.625 inches, 8.625 inches, 10.75 inches, 12.75 inches, 14 inches, 16 inches, 18 inches, 20 inches, 22 inches, 24 inches, or even greater.

Furthermore, the wall thicknesses of the pipes 26, 28, 30, 34, 36, 38, and 42 may, in certain embodiments, fall within a range of approximately 0.5 inch to 2.0 inches, or even greater. For example, the wall thicknesses of the pipes 26, 28, 30, 34, 36, 38, and 42 may be 0.5 inch, 0.625 inch, 0.75 inch, 0.875 inch, 1.0 inch, 1.125 inch, 1.25 inch, 1.375 inch, 1.5 inch, 1.625 inch, 1.75 inch, 1.875 inch, 2.0 inches, or even greater. In certain embodiments, all of the pipes 26, 28, 30, 34, 36, 38, and 42 of the jumper system 18 may have the same outside diameters and wall thicknesses. However, in other embodiments, the outside diameters and wall thicknesses may vary between/across the individual pipes 26, 28, 30, 34, 36, 38, and 42. Indeed, the outside diameters and wall thicknesses described herein are merely exemplary and not intended to be limiting.

All of the pipes 26, 28, 30, 34, 36, 38, and 42 of the jumper system 18 are generally rigid and are generally connected to the Christmas tree 20, manifold 22, and each other in a rigid manner using generally rigid connectors 44, 46. In other words, the pipes 26, 28, 30, 34, 36, 38, and 42 and the associated connectors 44, 46 generally do not include flexible materials (e.g., flexible pipe). Rather, for example, in certain embodiments, the pipes 26, 28, 30, 34, 36, 38, and 42 may be comprised of steel pipe and the connectors 44, 46 connecting the pipes 26, 28, 30, 34, 36, 38, and 42 to the Christmas tree 20, manifold 22, and each other may generally not include flexible connectors (e.g., rotating connectors, translating connectors, and so forth). In certain embodiments, the pipes 26, 28, 30, 34, 36, 38, and 42 may be comprised of AISI 4130 low alloy steel with a minimum yield strength of 75,000 pounds per square inch (psi). However, in other embodiments, other materials may be used for the pipes 26, 28, 30, 34, 36, 38, and 42.

The configuration of generally rigid pipes 26, 28, 30, 34, 36, 38, and 42 of the jumper system 18 illustrated in FIG. 1 may lead to several tangible benefits. For example, because the pipes 26, 28, 30, 34, 36, and 38 of the first and second u-shaped pipe formations 32, 40 are generally rigid, the main jumper pipe 42 remains elevated from the sub-sea floor 14 by a generally constant distance $\Delta_{JP}$. As such, the main jumper pipe 42 may be held very close to the surface of the sub-sea floor 14, where currents may be somewhat reduced, thereby reducing the vibratory fatigue on the main jumper pipe 42. In addition, the main jumper pipe 42 may be isolated from lying directly on the surface of the sub-sea floor 14, where contact with the surface of the sub-sea floor 14 may abrade the main jumper pipe 42 over time, thereby reducing the overall life of the main jumper pipe 42. Furthermore, the first and second u-shaped pipe formations 32, 40 enable a certain degree of horizontal and vertical vibration, allowing for some freedom of movement of the jumper system 18, again thereby reducing the vibratory fatigue on the main jumper pipe 42.

Figure 2:
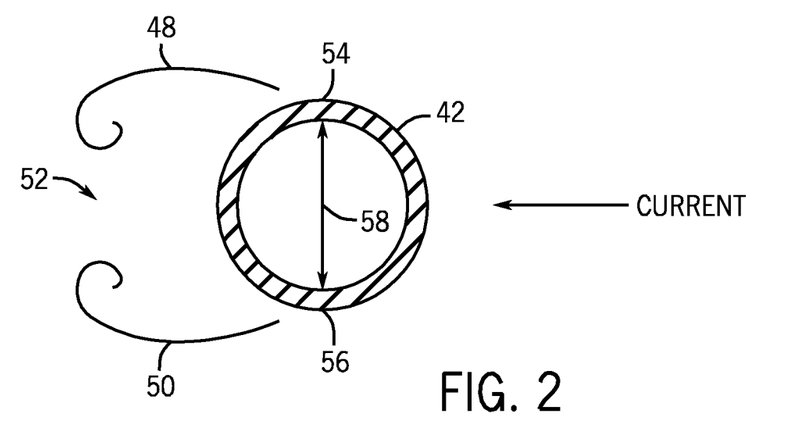
FIG. 2 is a cross-sectional view of a main jumper pipe of the jumper system taken along line 2-2 of FIG. 1, illustrating vortices that induces vibration.

However, this configuration of generally rigid pipes 26, 28, 30, 34, 36, 38, and 42 of the jumper system 18 may not completely eliminate vibration of the main jumper pipe 42. One of the main causes of vibration of the main jumper pipe 42 may be vortex-induced vibration. Vortex-induced vibration is generally caused by currents flowing across the main jumper pipe 42 in a direction generally orthogonal to the plane of FIG. 1 (e.g., into and out of FIG. 1). For example, FIG. 2 is a cross-sectional view of the main jumper pipe 42 of the jumper system 18 taken along line 2-2 of FIG. 1. As the current flows across the main jumper pipe 42 in a generally horizontal manner, the current flow is slowed by contact with the surface of the main jumper pipe 42. Vortices 48, 50 may be formed on a back side 52 of the main jumper pipe 42, away from the direction of flow of the current. However, these vortices 48, 50 are generally not synchronous. Rather, for example, a top vortex 48 may first be formed, followed by a bottom vortex 50, followed by another top vortex 48, and so forth. This pattern of successive vortices 48, 50 may cause oscillating forces on top and bottom surfaces 54, 56 of the main jumper pipe 42. As such, the oscillating forces may cause vertical vibration of the main jumper pipe 42, as illustrated by arrow 58. There may also be vibrations in the direction of current.

Figure 3:
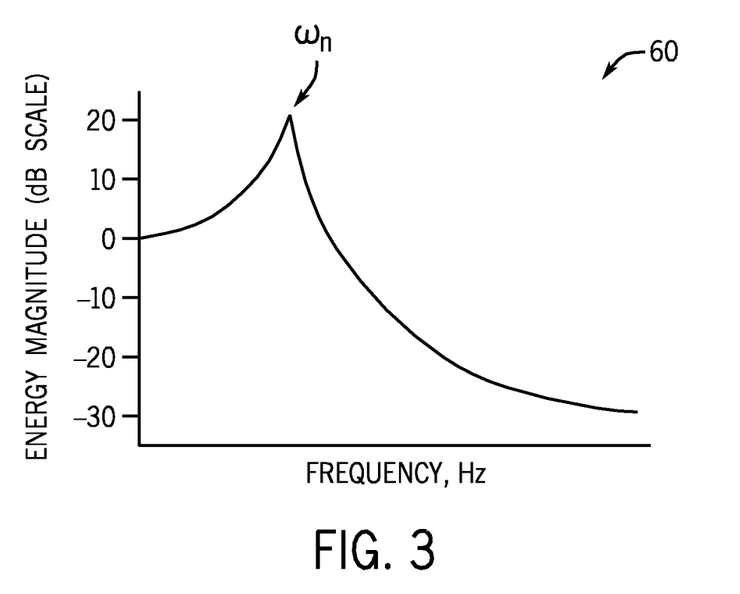
FIG. 3 is an exemplary chart of energy magnitude versus of the jumper system of FIG. 1 without a viscoelastic tuned mass damper system.

This vortex-induced vibration may lead to increased fatigue of the pipes 26, 28, 30, 34, 36, 38, and 42 of the jumper system 18 over time. In general, the energy magnitude of the jumper system 18 may be a function of the frequency of the vortex-induced vibration. FIG. 3 is an exemplary chart 60 of energy magnitude versus frequency of the jumper system 18 of FIG. 1. The degree of damping and degree of damage are directly proportional to the energy magnitude. The energy magnitude illustrated in FIG. 3 is on a 20 $\log_{10}$ decibel scale. For example, when the vortex-induced vibration is at a certain (very low) frequency, the energy magnitude may be at a reference level of 0 dB, meaning that the degree of damping is at a reference level of 100%. However, when the vortex-induced vibration is near the natural frequency $\omega_n$ of the jumper system 18, as illustrated in FIG. 3, the energy magnitude may be at a level of 1000% or ten times (e.g., 20 dB) of the reference level. In other words, at lower frequencies, the energy magnitude may be at somewhat expected levels. However, when the vortex-induced vibration frequency is near the natural frequency $\omega_n$ of the jumper system 18, the energy magnitude is substantially greater. However, at even higher frequencies, the energy magnitude may asymptotically decrease to levels of approximately 3.163% (e.g., −30 dB) of the reference level. The illustrated energy magnitudes of FIG. 3 are merely exemplary and not intended to be limiting.

The natural frequency $\omega_n$ of the jumper system 18 is the frequency at which the jumper system 18 vibrates with the largest energy magnitude when set in motion. In actuality, the jumper system 18 may have multiple natural frequencies $\omega_n$ (i.e. harmonic frequencies) above the natural frequency $\omega_n$ illustrated in FIG. 3. However, for simplicity, only the fundamental natural frequency $\omega_n$ is illustrated. In addition, the other natural frequencies $\omega_n$ generally tend to have magnitudes that are less than the fundamental natural frequency $\omega_n$. Therefore, the fundamental natural frequency $\omega_n$ is generally the most important frequency to be considered when attempting to minimize the energy magnitude of the jumper system 18. Indeed, as the frequency of the vortex-induced vibration approaches the fundamental natural frequency $\omega_n$ illustrated in FIG. 3, the jumper system 18 may become "locked-in." In other words, the jumper system 18 may become locked into a damage-inducing oscillating mode, which may be difficult to terminate. Therefore, the ability to minimize the maximum energy magnitude and/or change the fundamental natural frequency $\omega_n$ may lead to lower overall damage to a system, thereby extending its useful life.

Figure 4:
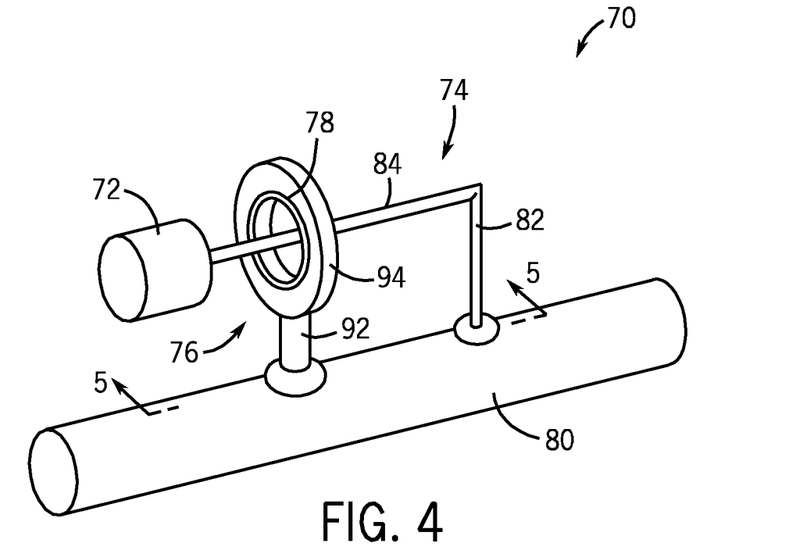
FIG. 4 is a perspective view of an embodiment of a viscoelastic tuned mass damper system.

FIG. 4 is a perspective view of an embodiment of a vibration damper system 70 coupled to a pipe structure 80. The vibration damper system 70 assists in changing the natural frequency of pipe(s) and/or reduces the vibrational energy caused by exposure to wind or water turbulence. The vibration damper system 70 includes a mass 72, a first beam 74, a second beam 76, and viscoelastic material 78. In the illustrated embodiment, the first beam 74 is an L-shaped beam having a first beam portion 82 and a second beam portion 84, wherein the first and second beam portions 82 and 84 are generally crosswise (e.g., perpendicular) to one another. The first beam portion 82 extends crosswise (e.g., perpendicular) to the pipe structure 80, while the second beam portion 84 extends along (e.g., parallel to) the pipe structure 80. The second beam 76 includes a first portion 92 and a second portion 94. The first portion 92 is crosswise (e.g., perpendicular) to the pipe structure 80, and is generally an elongated beam structure. The second portion 94 is a limiting device (e.g., a ring) that surrounds and provides a limited range of motion of the first beam 74 therein. Thus, the viscoelastic material 78 may be a ring-shaped strip inside the second portion 94. As discussed in detail below, the first and second beams 74 and 76 cooperate with one another to dampen vibration in the pipe structure 80.

In the present embodiment, the vibrational damper system 70 dampens vibrations in the pipe structure 80 (e.g., a jumper system) as the first beam 74 vibrates and impacts the viscoelastic material 78 within the second beam 76. The pipe structure 80, as explained above, may be subjected to turbulence by either wind or water that causes the pipe 78 to vibrate. As the pipe 80 vibrates, it causes the first beam 74 and mass 72 to vibrate. In some embodiments, the mass 72 is tuned to enable the first beam 74 to vibrate at the same natural frequency as the pipe structure 80. Thus, as the pipe structure 80 begins to vibrate at a specific frequency, the first beam 74 with the tuned mass 72 will correspondingly vibrate at the same frequency. At specific frequencies (e.g., resonance frequencies), the oscillations of the pipe structure 80 will cause the mass 72 and the first beam 74 to reach amplitudes sufficient for the first beam 74 to impact the second beam 76. The impact of the first beam 74 against the second beam 76 compresses the viscoelastic material 78 between the first beam 74 and the second beam 76. This impact allows the viscoelastic material 78 to absorb vibrational energy and thus dampen the vibrations of the pipe structure 80. In some embodiments, the second beam 76 may have a significant stiffness to reduce the introduction of additional dynamics, to the pipe structure 80, caused by the impact of the first beam 74 against the second beam 76. In this manner, the vibration damper system 70 limits/reduces the vibrational energy in the pipe structure 80.

Viscoelastic material is defined as material that exhibits the property of viscoelasticity. Viscoelastic materials have both viscous and elastic characteristics. Viscous materials resist shear flow and strain linearly with time when a stress is applied. Elastic materials strain instantaneously when stretched and then return to their original state once the stress is removed. Viscoelastic materials exhibit elements of both of these properties, and as such, exhibit time dependent strain. Exemplary viscoelastic materials may include acrylic viscoelastic material, viscoelastic damping polymer. These viscoelastic materials may come in a variety of forms (e.g., tape, spray coating, brush coating, premolded, a solution for dipping, etc.) These different forms facilitate the attachment and placement of the viscoelastic material 78 on the vibration damper system 70.

Figure 5:
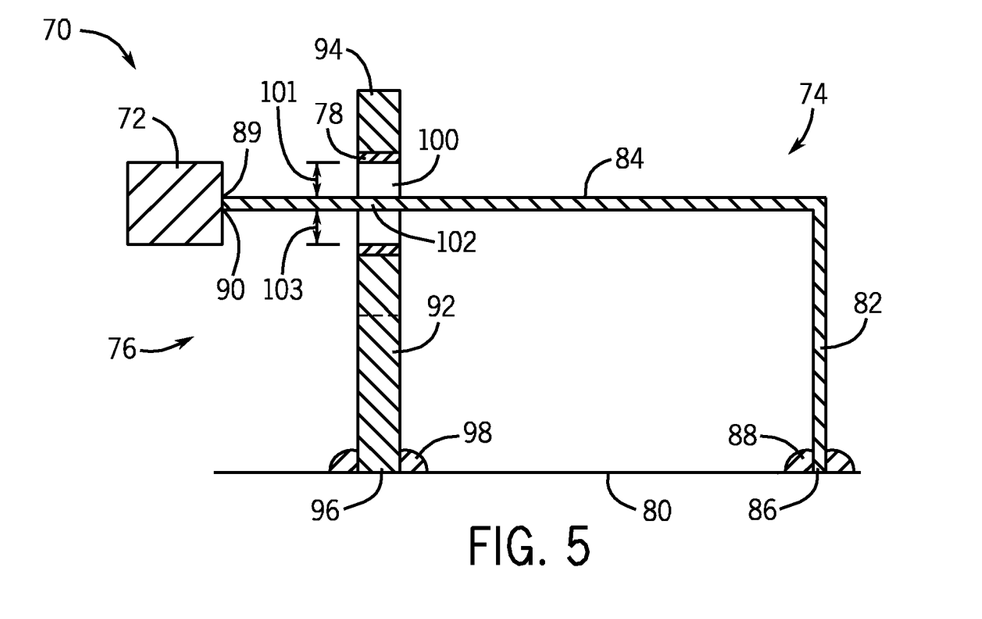
FIG. 5 is a cross-sectional side view of an embodiment of the viscoelastic tuned mass damper system of FIG. 4.

FIG. 5 is a cross-sectional side view according to an embodiment of the damper system 70 of FIG. 4. As illustrated in FIG. 5, the first beam 74 is an L-shaped having first beam portion 82 and the second beam portion 84 crosswise to one another. In other embodiments, the first beam 74 may curve or arc from the pipe structure 80 to the mass 72. The first beam portion 82 further defines an end portion 86 connected to the pipe structure 80 via a connection 88, such as a weld, a flange, a bolt, or any combination thereof. The connection 88 of the first beam 74 to the pipe structure 80 allows vibrational energy to transfer from the pipe structure 80 to the first beam 74 and the mass 72. The second beam portion 84 likewise defines a peripheral end portion 90, which couples to the mass 72 with a connection 89 such as a weld, a flange, a bolt, or an integral casting or machining with the second beam portion 84. The illustrated mass 72 is a solid cylinder, although embodiments of the mass 72 may include a square, spherical, oval, triangular, or other shape. Furthermore, the mass 72 may not be a single unitary mass, but may include several pieces that are distributed along the first beam 84 rather than connected solely at the end 90. In other embodiments, the second beam portion 84 may provide sufficient mass without the mass 72.

In order to limit/reduce vibration in the pipe structure 80, the vibration damping system 70 includes the second beam 76 to limit movement of the first beam 74 and dampen vibration with the viscoelastic material 78. The second beam 76 includes the first portion 92 and the second peripheral end portion 94. The first portion 92 defines an end portion 96 that is coupled to the pipe structure 80 with a connection 98, such as a weld, a flange, a bolt, or a combination thereof. In other embodiments, the second beam 76 may be attached to another structure rather than the pipe structure 80. For instance, only the L-shaped beam 74 may be attached to the pipe structure 80, while the second beam 76 attaches to another structure.

The second portion 94 of the second beam 76 is ring shaped and defines a circular opening 100. In other embodiments, the second portion 94 may define a different shaped opening 100, such as an oval opening, a square opening, a polygonal opening, a rectangular opening, a triangular opening, or any other shape. Alternatively the second portion 94 may define a non-continuous opening 100, e.g., one or more limiting structures above, below, left, and/or right of the first beam 74. The opening 100 surrounds a segment 102 of the first beam 74, and defines a limited range of movement of the segment 102 within the opening 100. For example, the opening 100 defines upper and lower ranges of movement 101 and 103 and left and right ranges of movement (i.e., in and out of the page). As mentioned above, as the pipe structure 80 vibrates in response to wind, water flow, or other drivers, the mass 72 and first beam 74 may corresponding begin to vibrate. Once the first beam 74 reaches a specific amplitude, the segment 102 contacts the viscoelastic material 78 disposed around the opening 100. The viscoelastic material 78 is therefore able to absorb vibrational energy from the pipe structure 80 by contact with the segment 102 of the first beam 74. As discussed above, the second beam 76 may have a significant stiffness and therefore may not emit a large vibrational response from the impact of the first beam 74 within the ring portion 94. In this way, the stiffness of the second beam 76 aids the viscoelastic material 78 in damping vibration in the pipe structure 80.

Figure 6:
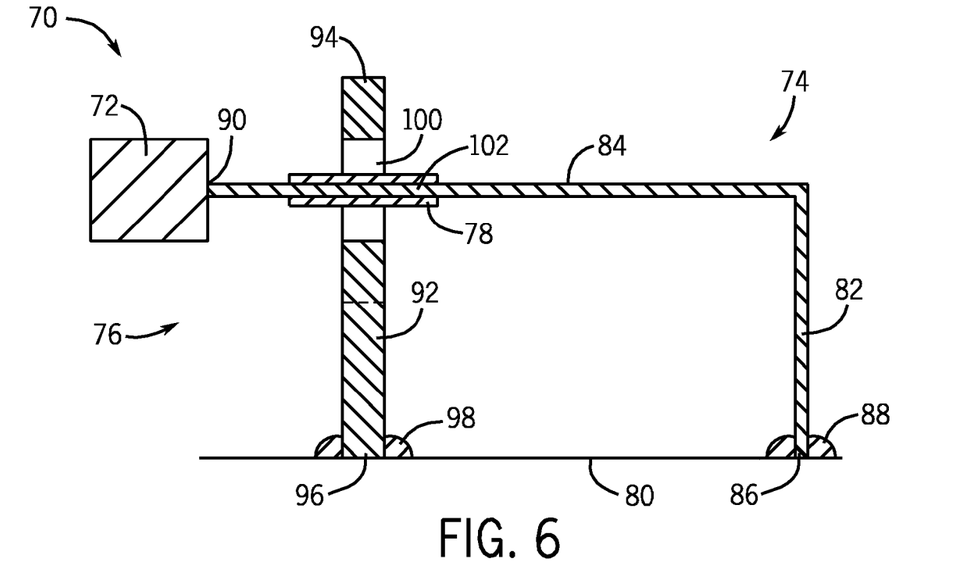
FIG. 6 is a cross-sectional side view of an embodiment of a viscoelastic tuned mass damper system.

FIG. 6 is a cross-sectional side view of an embodiment of a viscoelastic tuned mass damper system 70. In the embodiment of FIG. 6, the viscoelastic material 86 wraps around the L-shaped pipe 74, rather than lining the opening 100 in the second portion 94 (e.g., ring portion) of the second beam 76. This may reduce the amount of viscoelastic material 78 to dampen vibration between the first beam 74 and the second beam 76. In certain embodiments, the viscoelastic material 78 may include viscoelastic tape, a viscoelastic sleeve, a viscoelastic coating, or a combination thereof, disposed on the segment 102 of the first beam 74.

Figure 7:
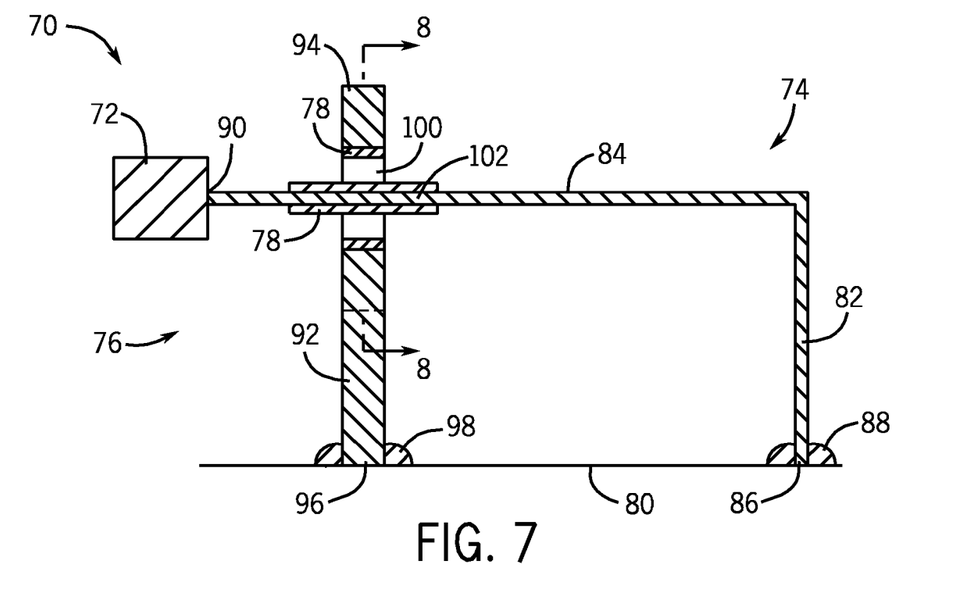
FIG. 7 is a cross-sectional side view of an embodiment of a viscoelastic tuned mass damper system.

FIG. 7 is a cross-sectional side view of a viscoelastic tuned mass damper system 70 according to another embodiment. In the embodiment of FIG. 7, the viscoelastic material 78 is placed on both the first beam 74 and the opening 100 of the second beam 76 (e.g., ring portion). Thus, during vibration, viscoelastic material 78 will contact viscoelastic material 78 as the first beam 74 moves toward and away from the second beam 76, thereby improving the dampening of vibrational energy. Furthermore, the illustrated embodiment provides redundancy with the viscoelastic material 78 in both locations, thereby ensuring that at least one viscoelastic material 78 is available for dampening vibrational energy. For instance, if the viscoelastic material 78 detaches from the opening 100, then the viscoelastic material 78 on the first beam 74 is still able to dampen vibrational energy, and vice versa.

Figure 8:
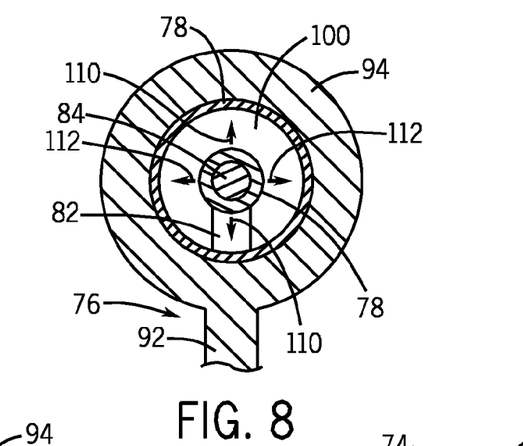
FIG. 8 is a cross-sectional front view of an embodiment of a viscoelastic tuned mass damper system illustrating possible movement of an L-shaped beam.
Figure 9:
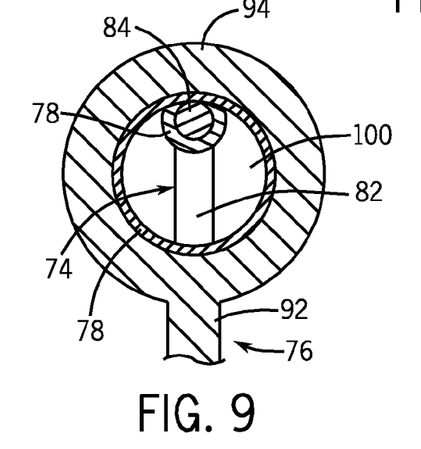
FIG. 9 is a cross-sectional front view of an embodiment of a viscoelastic tuned mass damper system illustrating movement of an L-shaped beam.
Figure 10:
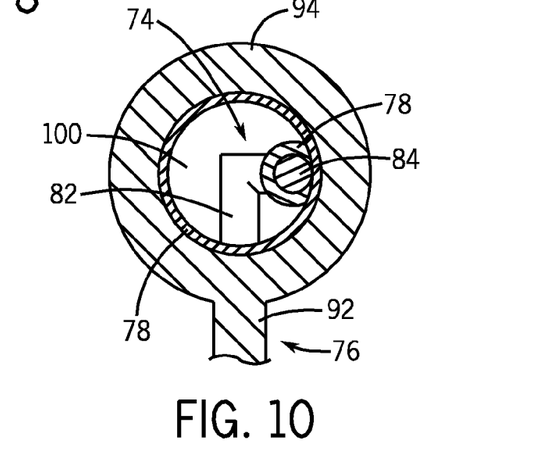
FIG. 10 is a cross-sectional front view of an embodiment of a viscoelastic tuned mass damper system illustrating movement of an L-shaped beam.

FIG. 8 is a cross-sectional front view of a damper system 70 illustrating possible movement of the second beam portion 84 of the first beam 74 within the second portion 94 (e.g., ring portion) of the second beam 76. For instance, if the vibration in the pipe structure 80 is in the vertical direction, then the tuned mass 72 and the first beam 74 will move in the direction of arrows 110, as illustrated in FIGS. 8 and 9. Likewise, if the vibration is in a horizontal direction, then the tuned mass 72 and the first beam 74 will move in the direction of arrows 112, as illustrated in FIGS. 8 and 10. Although, FIGS. 8-10 illustrate movement of the first beam 74 only in vertical or horizontal directions, the second beam 76 (e.g., ring portion) will allow movement in any lateral direction relative to an axis of the first beam 74. This multi-directional (e.g., 360 degrees) range of movement of the first beam 74 within the second beam 76 (e.g., ring portion) enables vibrational dampening of vibrational energy in any direction as the pipe structure 80 vibrates.

As discussed above, the opening 100 of the second beam 76 may have a variety of shapes to control dampening in various directions. For instance, if more damping is desired in a specific direction due to the design of the pipe structure, then the opening 100 may define a different shape that reduces vibration in certain directions while allowing more in others. For example, the opening 100 could be oval or rectangular in shape. These shapes may allow greater oscillations in one direction while reducing them in another. In still other embodiments, the viscoelastic material 78 thickness may be increased in designated locations of the opening 100 or on the first beam 74. The increased thickness may reduce vibrations in certain directions or compensate for viscoelastic material 78 wear by more frequent impact in known locations.

Figure 11:
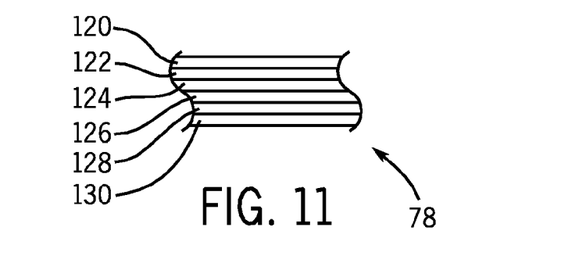
FIG. 11 is a cross-sectional view of an embodiment of a viscoelastic material that has multiple layers.

FIG. 11 is a cross-sectional view of an embodiment of the viscoelastic material 78 with multiple layers. For instance, the viscoelastic material 78 may include multiple layers (e.g. 2 to 10 or more layers). In the illustrated embodiment, the viscoelastic material 78 includes six layers 120, 122, 124, 126, 128, and 130. Each of these layers may include the same viscoelastic material or a different viscoelastic material than the other layers. In still other embodiments, different layers may have a first viscoelastic material while other layers may have a second viscoelastic material or a non-viscoelastic material. For example, layer 120 may be different from layers 122, 124, 126, 128, and 130. The layers may also differ in their properties relative to the other layers (e.g., each layer may be 5-100 percent different in its viscoelastic property, dampening value, etc., with respect to another layer). Furthermore, the layers may vary in thickness (e.g., 1 to 5, 1 to 10, 1 to 100, or 1 to 1000 percent different) in comparison to the other layers. The combination of the different layers may improve damping of the pipe structure 80 and/or protection of the viscoelastic material from environmental and/or impact damage.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A system, comprising:
a vibration dampener, comprising:
a first beam comprising a first mounting end portion and a first peripheral end portion, wherein the first peripheral end portion comprises a tunable mass, and the first beam is configured to vibrate in tune with a vibrational frequency of a structure supporting the first beam at the first mounting end portion;
a second beam comprising a second mounting end portion and a second peripheral end portion, wherein the second peripheral end portion comprises a ring disposed about the first beam; and
a viscoelastic material disposed between the first beam and the ring, wherein the viscoelastic material is configured to dampen vibrational energy as the first beam vibrates toward the ring until the viscoelastic material becomes compressed between the first beam and the ring.
2. The system of claim 1, wherein the viscoelastic material is disposed on the ring.

3. The system of claim 1, wherein the viscoelastic material is disposed on the first beam.

4. The system of claim 1, wherein the viscoelastic material comprises a first viscoelastic portion disposed on the first beam and a second viscoelastic portion disposed on the ring.

5. The system of claim 4, wherein the first and second viscoelastic portions have different material compositions, thicknesses, dampening values, or a combination thereof.

6. The system of claim 1, wherein the viscoelastic material is a viscoelastic tape.

7. The system of claim 1, wherein the viscoelastic material comprises a plurality of viscoelastic layers.

8. The system of claim 1, wherein the first beam comprises an L-shaped beam.

9. The system of claim 1, comprising a pipe coupled to the vibration dampener, wherein the first beam mounts to the pipe at the first mounting end portion, and the second beam mounts to the pipe at the second mounting end portion.

10. A system, comprising:
a tubular structure; and
a vibration dampener, comprising:
an L-shaped beam coupled to the tubular structure, wherein the L-shaped beam comprises a first segment protruding outwardly from the tubular structure and a second segment extending generally parallel to the tubular structure, and the second segment comprises a mass configured to tune the L-shaped beam to vibrate at a vibrational frequency of the tubular structure;
a ring coupled to the tubular structure, wherein the second segment of the L-shaped beam extends through the ring; and
a viscoelastic material disposed between the second segment and the ring, wherein the viscoelastic material is configured to dampen vibrational energy as the second segment vibrates toward the ring until the viscoelastic material becomes compressed between the second segment and the ring.

11. The system of claim 10, wherein the viscoelastic material is disposed on the ring.

12. The system of claim 10, wherein the viscoelastic material is disposed on the second segment.

13. The system of claim 10, wherein the viscoelastic material comprises a first viscoelastic portion disposed on the second segment and a second viscoelastic portion disposed on the ring.

14. The system of claim 13, wherein the first and second viscoelastic portions have different material compositions, thicknesses, dampening values, or a combination thereof.

15. The system of claim 10, wherein the viscoelastic material is a viscoelastic tape.

16. The system of claim 10, wherein the viscoelastic material comprises a plurality of viscoelastic layers having different material compositions, thicknesses, dampening values, or a combination thereof.

17. A system, comprising:
a mineral extraction component; and
a vibration dampener, comprising:
a beam coupled to the mineral extraction component, wherein the beam is configured to vibrate in tune with vibration of the mineral extraction component;
a ring separate from the beam, wherein the beam extends through the ring; and
a viscoelastic material disposed between the beam and the ring, wherein the viscoelastic material is configured to dampen vibrational energy as the beam vibrates toward the ring until the viscoelastic material becomes compressed between the beam and the ring.

18. The system of claim 17, wherein the viscoelastic material is disposed on the beam, the ring, or a combination thereof.

19. The system of claim 17, wherein the viscoelastic material is a viscoelastic tape.

20. The system of claim 17, comprising a plurality of viscoelastic layers having different material compositions, thicknesses, dampening values, or a combination thereof.

* * * * *